(12) United States Patent
Suzanne et al.

(10) Patent No.: US 10,637,754 B2
(45) Date of Patent: Apr. 28, 2020

(54) MANAGEMENT OF ELECTRONIC ENTITIES FOR THE CREATION OF A NEWSFEED

(71) Applicant: ORANGE, Paris (FR)

(72) Inventors: Benoît Suzanne, Nanterre (FR); Jérôme Galloyer, L'ile Saint Denis (FR)

(73) Assignee: ORANGE, Paris (FR)

( * ) Notice: Subject to any disclaimer, the term of this patent is extended or adjusted under 35 U.S.C. 154(b) by 101 days.

(21) Appl. No.: 15/539,636

(22) PCT Filed: Dec. 21, 2015

(86) PCT No.: PCT/FR2015/053671
§ 371 (c)(1),
(2) Date: Jun. 23, 2017

(87) PCT Pub. No.: WO2016/102860
PCT Pub. Date: Jun. 30, 2016

(65) Prior Publication Data
US 2018/0262409 A1    Sep. 13, 2018

(30) Foreign Application Priority Data

Dec. 24, 2014  (FR) ..................... 14 63340

(51) Int. Cl.
*H04L 12/26*   (2006.01)
*H04L 29/08*   (2006.01)
*H04L 12/24*   (2006.01)

(52) U.S. Cl.
CPC ............ *H04L 43/045* (2013.01); *H04L 41/04* (2013.01); *H04L 43/065* (2013.01); *H04L 67/12* (2013.01)

(58) Field of Classification Search
CPC ..... H04L 43/045; H04L 43/065; H04L 41/04; H04L 67/12

(Continued)

(56) References Cited

U.S. PATENT DOCUMENTS 8,543,665 B2 *  9/2013 Ansari ................... G06Q 30/04
                                                        709/218
9,787,853 B1 * 10/2017 Balakrishnan .......... H04W 4/70
(Continued)

FOREIGN PATENT DOCUMENTS

WO    WO 2013/186519 A2    12/2013

OTHER PUBLICATIONS

French Preliminary Search Report and Written Opinion dated Nov. 30, 2015 issued in French Application No. FR20140063340, 6 pages.

(Continued)

*Primary Examiner* — Abdullahi E Salad
(74) *Attorney, Agent, or Firm* — Knobbe, Martens, Olson & Bear LLP

(57) ABSTRACT

The invention relates a method for managing a plurality of electronic entities, each electronic entity registered with a main management server which is associated with a given type and with a user identifier in the main management server, and capable of transmitting event data to the main management server. The method includes the following steps: a secondary management server transmits (26) to the main management server a request indicating information relative to a first type of electronic entity and including a first user identifier; the main management server determines (27) a first set of electronic entities, including the electronic entities associated with the first type identified in the request and associated with the first user identifier; the main management server transmits (28) event data from electronic entities of the first set to the secondary management server; the secondary management server publishes (29) event data from said electronic entities of the first set on a newsfeed of a user associated with the first user identifier.

11 Claims, 3 Drawing Sheets

(58) Field of Classification Search
USPC .......................................................... 709/224
See application file for complete search history.

(56) References Cited

U.S. PATENT DOCUMENTS

| | | | | |
|---|---|---|---|---|
| 9,967,149 B1* | 5/2018 | Fiennes | ................. | H04W 76/10 |
| 2012/0109384 A1* | 5/2012 | Stepanian | ................. | G06F 21/10 |
| | | | | 700/275 |
| 2012/0278454 A1* | 11/2012 | Stewart | .................. | H04L 67/34 |
| | | | | 709/220 |
| 2013/0080641 A1* | 3/2013 | Lui | .......................... | H04L 67/10 |
| | | | | 709/226 |
| 2013/0097238 A1 | 4/2013 | Rogers et al. | | |
| 2013/0157612 A1* | 6/2013 | Cordero | ................. | H04W 4/90 |
| | | | | 455/404.2 |
| 2014/0207282 A1* | 7/2014 | Angle | ................. | H04L 12/282 |
| | | | | 700/257 |
| 2014/0244017 A1* | 8/2014 | Freiwirth | .............. | B29C 64/386 |
| | | | | 700/100 |
| 2014/0244834 A1* | 8/2014 | Guedalia | ................ | H04L 67/16 |
| | | | | 709/224 |
| 2014/0313882 A1* | 10/2014 | Rucker | .................. | H04W 4/70 |
| | | | | 370/219 |
| 2014/0342709 A1* | 11/2014 | Stepanian | ............. | G06F 1/1698 |
| | | | | 455/414.1 |
| 2015/0006695 A1* | 1/2015 | Gupta | ..................... | H04L 41/32 |
| | | | | 709/223 |
| 2015/0019553 A1* | 1/2015 | Shaashua | ................ | H04W 4/70 |
| | | | | 707/737 |
| 2015/0019714 A1* | 1/2015 | Shaashua | ................ | H04W 4/70 |
| | | | | 709/224 |
| 2015/0042240 A1* | 2/2015 | Aggarwal | ........... | H04L 12/2803 |
| | | | | 315/292 |
| 2015/0072704 A1* | 3/2015 | Colby | .................. | H04W 4/023 |
| | | | | 455/456.1 |
| 2015/0088979 A1* | 3/2015 | Dong | ........................ | H04W 4/70 |
| | | | | 709/203 |
| 2015/0134481 A1* | 5/2015 | Glickfield | .......... | G06Q 30/0609 |
| | | | | 705/26.35 |
| 2015/0134761 A1* | 5/2015 | Sharma | .................... | H04L 67/26 |
| | | | | 709/207 |
| 2015/0156266 A1* | 6/2015 | Gupta | ..................... | H04W 4/70 |
| | | | | 709/224 |
| 2015/0163121 A1* | 6/2015 | Mahaffey | ............ | G06F 11/0766 |
| | | | | 707/687 |
| 2015/0185713 A1* | 7/2015 | Glickfield | .............. | G05B 15/02 |
| | | | | 700/44 |
| 2015/0213355 A1* | 7/2015 | Sharma | .................. | G06N 3/006 |
| | | | | 706/11 |
| 2015/0227890 A1* | 8/2015 | Bednarek | ......... | G06Q 10/08355 |
| | | | | 705/26.81 |
| 2015/0256385 A1* | 9/2015 | Chandhok | ............... | H04L 41/18 |
| | | | | 715/734 |
| 2015/0288622 A1* | 10/2015 | Fargano | .................. | H04L 43/08 |
| | | | | 370/401 |
| 2015/0324400 A1* | 11/2015 | Sheck | ..................... | H04L 67/22 |
| | | | | 707/795 |
| 2015/0347114 A1* | 12/2015 | Yoon | ......................... | G06F 8/61 |
| | | | | 235/375 |
| 2015/0358777 A1* | 12/2015 | Gupta | ................. | H04L 12/2807 |
| | | | | 370/254 |
| 2015/0358874 A1* | 12/2015 | Ahn | ........................ | H04L 12/66 |
| | | | | 370/331 |
| 2016/0004871 A1* | 1/2016 | Guedalia | ............... | H04W 4/023 |
| | | | | 726/26 |
| 2016/0041534 A1* | 2/2016 | Gupta | ................ | G05B 13/0265 |
| | | | | 700/275 |
| 2016/0072638 A1* | 3/2016 | Amer | .................. | H04L 12/2818 |
| | | | | 398/106 |
| 2016/0085594 A1* | 3/2016 | Wang | ..................... | H04L 67/18 |
| | | | | 709/226 |
| 2016/0102878 A1* | 4/2016 | Smith | ...................... | F24F 11/62 |
| | | | | 700/276 |
| 2016/0134932 A1* | 5/2016 | Karp | ........................ | H04W 4/80 |
| | | | | 348/155 |
| 2016/0149767 A1* | 5/2016 | Britt | ........................ | H04L 41/22 |
| | | | | 715/727 |
| 2016/0149917 A1* | 5/2016 | Matthieu | .................. | H04W 4/70 |
| | | | | 726/4 |
| 2016/0150021 A1* | 5/2016 | Britt | ........................ | H04W 4/70 |
| | | | | 709/219 |
| 2016/0261425 A1* | 9/2016 | Horton | ............... | G05D 23/1917 |
| 2016/0335686 A1* | 11/2016 | AthuluruTlrumala | ....................... | |
| | | | | G06F 3/0482 |
| 2016/0335731 A1* | 11/2016 | Hall | ...................... | G06Q 50/163 |
| 2016/0342906 A1* | 11/2016 | Shaashua | ................ | H04L 67/22 |
| 2017/0054594 A1* | 2/2017 | Decenzo | ................. | H04L 67/12 |
| 2017/0126512 A1* | 5/2017 | Seed | .................... | H04L 41/5045 |
| 2017/0208151 A1* | 7/2017 | Gil | .......................... | G06F 21/57 |
| 2017/0339178 A1* | 11/2017 | Mahaffey | .............. | H04L 41/142 |
| 2018/0027128 A1* | 1/2018 | Balakrishnan | .......... | H04W 4/70 |
| | | | | 455/406 |
| 2018/0152557 A1* | 5/2018 | White | ................... | H04M 3/527 |
| 2019/0289648 A1* | 9/2019 | Kim | .................... | H04L 41/0803 |

OTHER PUBLICATIONS

International Search Report and Written Opinion (with English translation) dated Jun. 30, 2016 issued in International Application No. PCT/FR2015/053671, 10 pages.

* cited by examiner

MANAGEMENT OF ELECTRONIC ENTITIES FOR THE CREATION OF A NEWSFEED

This application is the U.S. National Phase application of International Application No. PCT/FR2015/053671, entitled "MANAGEMENT OF ELECTRONIC ENTITIES FOR THE CREATION OF A NEWSFEED," filed Dec. 21, 2015, which designated the United States, and which claims the benefit of French Application No. 1463340, filed Dec. 24, 2014, the entire contents of each of which are hereby incorporated by reference herein in their entirety and for all purposes.

The present invention relates to the field of management of a plurality of electronic entities, and in particular the management of connected entities or objects.

The invention advantageously applies to a network of connected objects, for example belonging to a user or business.

"Connected object" is understood to mean any object suitable for implementing given actions and having a communication interface for sharing information over a network. No restrictions are placed on the communication interface concerned. The following considers the purely illustrative example of objects connected to a wireless network by a Wi-Fi interface.

Connected objects can upload information, or event data, to a network interface to which the connected objects have access. This information is then transmitted to a remote or local server to enable the user to view them.

Event data uploaded by a set of connected objects of a user can be aggregated on a remote, or local server. The user can then access the event data using a terminal such as a smartphone, touchscreen tablet, or computer for example (or any terminal enabling access to the local or remote network).

The event data may be published on a newsfeed presenting the event data, for example chronologically, as well as the connected object that provided the data for each particular event.

However, such a newsfeed groups event data from all the connected objects of a given user.

There is no solution for differentiating newsfeeds by the types of connected objects uploading different kinds of event data (concerning cooking, the weather, energy management for example), or by connected objects located in a common area or having the same manufacturer. The result is inconvenience and wasted time for a user who wishes to access only the event data from certain connected objects.

There is therefore a need to provide a solution enabling the aggregation of event data from connected objects of a given type.

The present invention improves the situation.

To this end, a first aspect of the invention relates to a method a method for managing a plurality of electronic entities, each electronic entity that is registered with a main management server being:
  associated with a given type and with a user identifier in the main management server, and
  capable of transmitting event data to the main management server.
The method comprises the following steps:
  a secondary management server transmits to the main management server a request indicating information relating to a first type of electronic entity and comprising a first user identifier;
  the main management server determines a first set of electronic entities comprising the electronic entities associated with the first type identified in the request and associated with the first user identifier;
  the main management server transmits event data from electronic entities of the first set to the secondary management server;
  the secondary management server publishes event data from electronic entities of the first set on a newsfeed of a user associated with the first user identifier.

The term "type of electronic entity" is understood to mean any category in which an electronic entity (a connected object) can be classified. No restrictions are placed on the criteria used for classification: use of the connected object, location, manufacturer, years of service, etc.

A main management server can centralize all the electronic entities of one or more users, and display a "global" newsfeed grouping event data from all the electronic entities. As explained above, such a newsfeed is in no way specific to a type of electronic entity, and requires sorting by the user in order to access the relevant event data. The method of the invention allows grouping electronic entities by type, in order to be able to send event data relating to a given type to secondary management servers. The secondary management server, which may belong to a manufacturer of electronic entities of a given type, can thus generate a newsfeed specific to this type, which is advantageous for the user.

According to one embodiment of the invention, the method may further comprise a step of registering a first electronic entity with the secondary management server, the first electronic entity being associated with the first type and with the first user identifier, and the first electronic entity being adapted to transmit event data to the secondary management server.

In particular, the secondary management server may be dedicated to first electronic entities (for example, the secondary management server is a service of the manufacturer of the first electronic entities). The secondary management server thus integrates the registration functions of the main management server.

According to one embodiment of the invention, the method may comprise a prior step of installing an application on a terminal of a user associated with the first user identifier, the application enabling access to the secondary management server, the request being transmitted by the secondary management server upon receipt of a user request issued from the application installed on the user terminal.

The newsfeed can thus be created at the request of the user, which avoids unnecessary exchanges in the network connecting the management servers. In addition, an application dedicated to the secondary management server can simplify user access to the secondary management server.

Alternatively, the request may be transmitted by the secondary management server following the step of registering the first electronic entity with the secondary management server.

The trigger for transmission of the request in this step can thus be the registration of a first electronic entity of the user with the secondary management server (rather than the user sending a request via the application installed on the terminal). The event data from the entities of the first set can thus be stored in the secondary management server, which can then return them to the application of the user upon user request or spontaneously.

Additionally, the event data from the first electronic entity may be published on the user's newsfeed with the event data from electronic entities of the first set.

Thus, the secondary management server can concatenate the event data from the electronic entities registered with the main management server, and the data from the first electronic entities, which enriches the newsfeed while displaying only the event data relating to a first type.

Additionally or alternatively, the method may further comprise the following steps:

the secondary management server transmits event data from the first electronic entity to the main management server;

the main management server publishes the event data on a global newsfeed of the user associated with the first user identifier.

The main management server can thereby maintain a global newsfeed that displays event data from numerous electronic entities, even those that are not registered with the main management server.

According to one embodiment of the invention, the sending of the request to the main management server is dependent upon prior registration of the first electronic entity with the secondary management server.

Such an embodiment allows reserving access to the service offered by the secondary management server, to users who have previously registered a connected object with the secondary management server.

In one embodiment, the information relating to the first type of device may be an identifier of the first electronic entity, and the identifier of the first electronic entity may have been previously registered with the main management server in association with an identifier of the first type.

It is then not required to store a lookup table matching identifiers of electronic entities with type identifiers of the management server.

Alternatively, the information relating to the first type of device may be an identifier of the first type.

A second aspect of the invention relates to a computer program comprising instructions for implementing the method according to the first aspect of the invention, when these instructions are executed by a processor.

A third aspect of the invention relates to a secondary management server for a newsfeed of a user, the secondary management server comprising:

a transmission unit for transmitting, to a main management server, a request indicating information relating to a first type of electronic entity and comprising a first user identifier;

a reception unit for receiving, from the main management server, event data originating from electronic entities of a first set, the first set comprising electronic entities associated with the first type identified in the request and associated with the first user identifier;

a processor adapted to publish the event data originating from electronic entities of the first set, on a newsfeed of a user associated with the first user identifier.

A fourth aspect of the invention relates to a main management server for a plurality of electronic entities, comprising:

a memory storing each electronic entity in association with a given type and a user identifier;

a reception unit adapted to:

receive event data from electronic entities;

receive, from a secondary management server, a request indicating information relating to a first type of electronic entity and comprising a first user identifier;

a processor adapted to determine a first set of electronic entities comprising the electronic entities which are associated with the first type identified in the request and which are associated with the first user identifier;

a transmission unit for transmitting event data originating from the electronic entities of the first set, to the second management server.

A fifth aspect of the invention relates to a system for managing a plurality of electronic entities, comprising a main management server according to the fourth aspect of the invention and a secondary management server according to the third aspect of the invention.

Other features and advantages of the invention will be apparent from the following detailed description and from the appended drawings in which.

Figure 1:
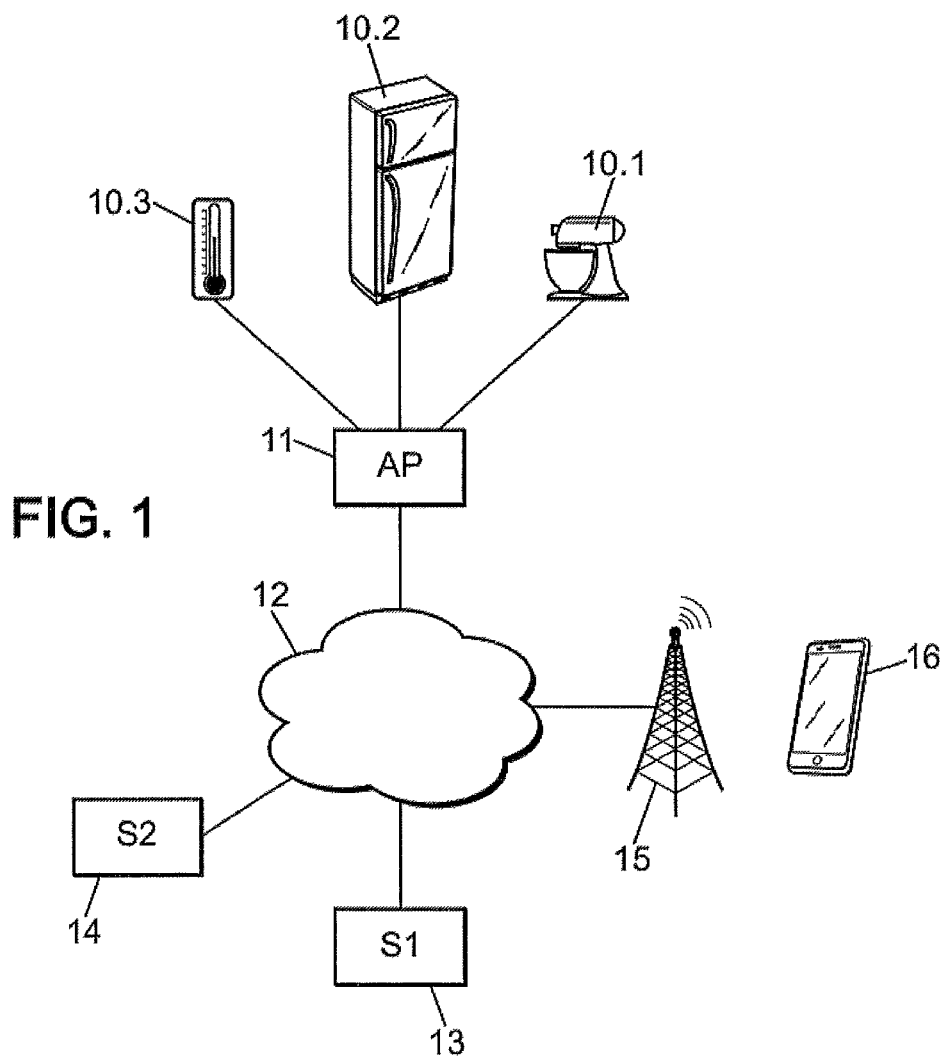
FIG. 1 illustrates a system according to an embodiment of the invention.

FIG. 1 illustrates a system for managing a plurality of electronic entities 10.1, 10.2, and 10.3 according to one embodiment of the invention. The managed electronic entities are connected objects in the following example. As an illustration, the system may thus comprise a food processor 10.1, a refrigerator 10.2, and a thermometer 10.3 which all belong to the same user.

The entities 10.1, 10.2, and 10.3 are connected objects and thus have respective interfaces enabling access to a network 12 via an access point 11, which can be a Wi-Fi terminal for example. A single access point 11 has been represented. However, the invention also covers cases in which the entities 10.1, 10.2, and 10.3 access the network 12 via separate access points.

The access point 13 allows the entities 10.1, 10.2, and 10.3 to access the network 12, such as the Internet for example, and thus to access remote servers such as a main management server 13 and a secondary management server 14 according to embodiments of the invention. Alternatively, one or the other (or both) of the management servers 13 and 14 may be integrated in a users local area network.

As detailed in the following, each of the entities 10.1, 10.2, and 10.3 is able to upload event data to the access point 11. For example, the food processor 10.1 can send instructions to the user when intervention is required (adding an ingredient, for example) or can indicate the time when a dish will be ready. The refrigerator 10.2 can indicate all the products it contains, generate an alert, or indicate its operating temperature. The thermometer 10.3 can send a temperature measured at a given time in the room where it is located.

Using these event data, the main management server 13 can update a global newsfeed where it publishes all the informational data it receives. For this purpose, prior registration of each of the entities 10.1, 10.2, and 10.3 may be required, as described below.

The secondary management server 14 may be a server specifically dedicated to one or more of the entities 10.1, 10.2, and 10.3. In the following example, the secondary management server 14 is a server of the manufacturer of the food processor 10.1. This example is given purely for illustrative purposes and does not restrict the invention to this particular embodiment. It may be provided that when the user first connects the food processor 10.1 to the access point 11, the food processor registers with the secondary management server 14 in association with a first identifier specific to the user for example. Alternatively, the user himself or herself may access the secondary management server 14 to register the food processor 10.1.

For this purpose, the user may use a terminal 16 such as a smart phone, a touchscreen tablet, or a desktop or laptop computer, or any terminal enabling access to the network 12. In the example illustrated in FIG. 1, the terminal 16 is a smart phone and accesses the network 12 via a mobile network access point 15 (type NodeB or eNodeB for example). This type of access is given for illustrative purposes only. For example, the terminal 16 may be equipped with a Wi-Fi interface enabling access to the network 12 via the access point 11, when the user is at home for example.

As detailed in the following, the terminal 16 may also store and execute applications for viewing the respective newsfeeds created by the main management server 13 and the secondary management server 14.

Figure 2:
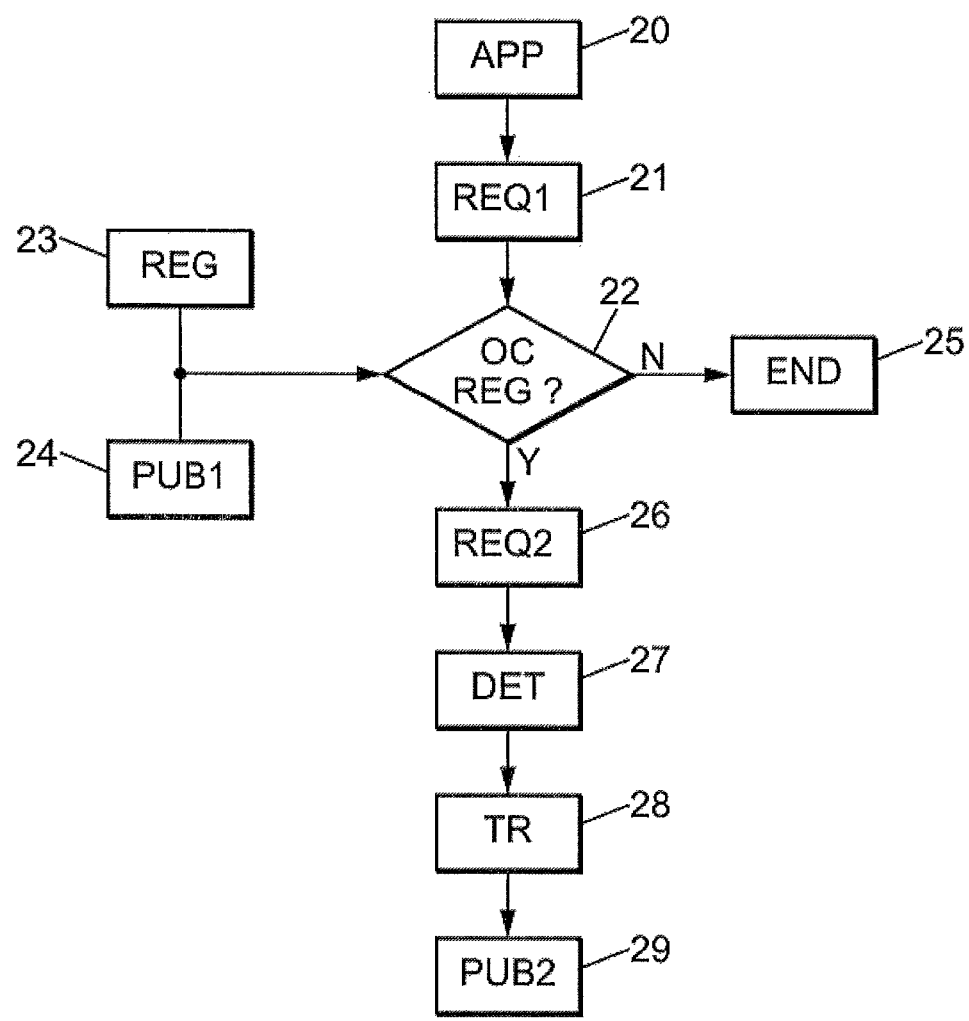
FIG. 2 is a flowchart illustrating the steps of a method according to an embodiment of the invention.

FIG. 2 is a flowchart illustrating the steps of a method according to an embodiment of the invention.

In a preliminary step 20, the user can install an application on the terminal 16. The application is associated with the secondary management server. One will recall that the secondary management server is, in the current example, specifically dedicated to food processors such as food processor 10.1 (or more broadly dedicated to all kitchen appliances of a manufacturer in this field): the application offers a set of services to the user, related for example to the kitchen.

In step 21, the user can ask the secondary management server 14 to create a newsfeed comprising event data from electronic entities of the user which are associated with a first type. For example, the user may wish to receive event data from his or her connected objects associated with the "kitchen" type (the food processor 10.1 and the refrigerator 10.2). For this purpose, a user request may be sent from the application installed on the terminal 16, to the secondary management server 14. The user request may be sent after the user makes a selection from a menu of the application installed on the terminal 16, the menu offering to group the user's electronic entities associated with the "kitchen" type.

The user request may include a first user identifier as well as information relating to the first type of electronic device. Information relating to the first type of electronic device may be an identifier of the first type, for example a keyword such as "kitchen" in the current example. When the secondary management server 13 is specific to a single type of electronic entity (for example specific to the "kitchen" type), the user request may not include information relating to the first type of electronic device.

In addition, no restrictions are placed on the form of the first user identifier, which may be an email address, a "login" type identifier, or a "login"/password pair for example. The first user identifier corresponds to the user identifier associated with the electronic entities 10.2 and 10.3 (and optionally 10.1) that were previously registered with the main management server 13. Entities 10.2 and 10.3 are considered to have been registered with the main management server 13, for example when they were first connected to the access point 11 of the user, said server being adapted to manage the set of electronic entities of a user.

For example, when registering the thermometer 10.3, an identifier for the thermometer 10.3 is transmitted to the main management server 13 in association with the first user identifier, and optionally with a corresponding type (in this case the "energy management" type for example). The main management server 13 then stores the identifier of the thermometer 10.3 in association with the first user identifier and with the "energy management" type. In cases where the type of the thermometer 10.3 was not specified when registering the thermometer 10.3 with the main management server 13, the user can access the main management server 13 via his or her terminal 16 (via an application dedicated to the main management server 13 for example) in order to specify (or assign by choosing from a predetermined list) a type to the thermometer 10.3.

The same process applies for registering the refrigerator 10.2, for which the identifier is stored in association with the first user identifier and the "kitchen" type.

Once registered with the main management server 13, the electronic entities 10.2 and 10.3 can transmit event data to the main management server 13 which publishes them on a global newsfeed accessible to the user via his or her terminal 16. Such a global newsfeed may correspond to the newsfeed of the prior art described in the introduction.

Registration of the food processor 10.1 with the main management server 13 is optional, as described below.

In step 22, upon receipt of the user request, the secondary management server 14 verifies whether the identified user is at least associated with a first electronic entity previously registered with the secondary management server 14. The term "first" electronic entity is used for an electronic entity associated with the first type ("kitchen" type in the example) and having a relation with the secondary management server (for example, the company managing the secondary management server also manufactures the first electronic entity).

If such is not the case (verification is NO in step 22), the secondary management server 14 may refuse the user request in a step 25. Such a verification ensures that the service of providing a newsfeed composed of event data from entities of a first given type, is available to a user who already owns an electronic entity associated with the secondary management server (which may be a server of a manufacturer of such an electronic entity, in this case the manufacturer of the food processor 10.1).

If such is the case (verification is YES in step 22), the opposite is true: the food processor 10.1 has been registered with the secondary management server 14 in a step 23 prior to step 22, for example when the food processor 10.1 first accesses the secondary management server 14 via the access point 11. During registration, the secondary management server 14 stores an identifier for the food processor 10.1 in association with the first user identifier and the "kitchen" type.

The food processor 10.1, once registered, can transmit event data (such as the need to add an ingredient, the cooking end time, etc.) to the secondary management server 14 which can publish the event data, in step 24, in a newsfeed accessible to the user via the application installed in step 20. Additionally or alternatively, in step 24 the event data from the food processor 10.1 can be transmitted from the secondary management server 14 to the main management server 13 so that it publishes the food processor event data on the global newsfeed, with the event data of the refrigerator 10.2 and the thermometer 10.3.

If step 22 confirms that at least a first electronic entity of the user has been registered with the secondary management server 24, then a request indicating the information relating to a first type of electronic entity and including the first user identifier is transmitted from the secondary management server 14 to the main management server 13, in step 26.

Upon receiving the request, the main management server 13 determines, in step 27, a first set of electronic entities comprising the electronic entities associated with the first type identified in the request and associated with the first user identifier. Several embodiments are provided for determining the first type from the information relating to the first type.

In cases where the information relating to the first type is an identifier of the first type, the determination is immediate.

Alternatively, the information relating to the first type may be an identifier of the first electronic entity (the food processor 10.1), and the main management server 13 may store a lookup table that maps identifiers of electronic entities to types of electronic entities. Such a lookup table may be predefined or may be entered manually by the user from the terminal 16 accessing the main management server 13.

The determination in step 27 may be implemented by accessing a database or a memory storing associations between the identifiers of electronic entities registered with the main management server 13, the types, and the user identifiers. The identifiers of electronic entities of the first set can thus be extracted. In the example shown in FIG. 1, the electronic entities of the first set (associated with the "kitchen" first type) are the refrigerator 10.2, and the food processor 10.1 if the food processor 10.1 has been registered with the main management server.

In step 28, the main management server 13 transmits to the secondary management server 14 the event data from electronic entities of the first set (at least the event data from the refrigerator 10.2).

The secondary management server 14 thus publishes, in step 29, event data which all come from electronic entities of the "kitchen" first type, as requested by the user, which eliminates the user having to view a global newsfeed such as the one published by the main management server 13 and to sort between event data from different types of entities. The event data published by the secondary management server 14 on the user's newsfeed may be:
- all the event data (from the electronic entities of the first set) received from the main management server 13, following transmission of the request;
- or all the event data (from the electronic entities of the first set) received from the main management server 13, following transmission of the request, as well as the event data from the first electronic entity or entities registered with the secondary management server in association with the first type (the food processor 10.1).

The event data published on the newsfeed by the secondary management server 14 may be updated in one of the following ways:
- upon receipt of new event data from an entity of the first set, the main management server 13 transmits the event data to the secondary management server 14 which publishes it on the user's newsfeed;
- the main management server 13 transmits, at regular intervals, all new event data from electronic entities of the first set and received during the current interval, to the secondary management server 14 which publishes the new event data on the user's newsfeed;
- the secondary management server 14 transmits a new request (after prior receipt of a user request from the application installed on the user terminal 16 for example) in order to obtain the event data of the electronic entities of the first set, received by the main management server 13 (in the interval between receipt of the request in step 26 and that of the new request), and, in response to this new request, the main management server 13 sends the requested event data.

The embodiments described with reference to FIG. 2 are given for illustrative purposes. Steps 20-25 described above are optional. For example, the method according to the invention may begin in step 26, initiated by the secondary management server 14, which may request the event data of the first set for some or all users who have a first electronic entity registered with the secondary management server 14. The event data returned by the main management server 13 can then be stored, and the newsfeed can be generated from local data upon receipt of a user request.

Furthermore, according to an alternative embodiment, steps 20 and 21 are not implemented, and upon registration of a first electronic entity (such as the food processor 10.1) with the secondary management server 12 (step 23), the first electronic entity being associated with the first type, the secondary management server 12 sends the request of step 26. The trigger for transmission of the request of step 26 can thus be the registration of a first electronic entity of the user with the secondary management server 14 (rather than the user sending a request via the application installed on the terminal).

The event data from electronic entities of the first set can thus be stored in the secondary management server 14, which can then return them to the user at the request of the user or spontaneously, without having to re-access the main management server 13.

Moreover, in the case of registration of a second electronic entity (a thermostat of the first user, for example) associated with a second type ("energy management" type for example) with the secondary management server 14 (or another secondary management server, of the thermostat manufacturer for example), a second request is generated by the secondary management server in order to request, from the main management server 13, event data from a second set of electronic entities associated with the second type. For this purpose, the second request includes information relating to the second type as well as the first user identifier.

Figure 3:
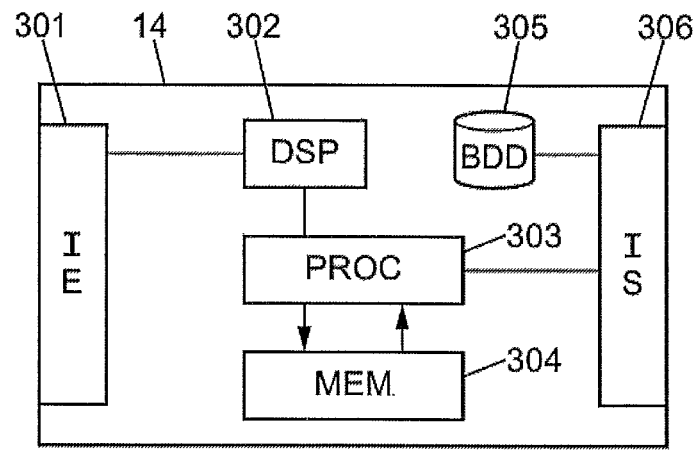
FIG. 3 shows a secondary management server according to one embodiment of the invention.

FIG. 3 represents a secondary management server 14 according to one embodiment of the invention.

The secondary management server 14 comprises random access memory 304 and a processor 303 for storing instructions to implement the steps of the method described above which are specific to the secondary management server 14. In particular, the processor 303 is configured for:
- managing the registration of first electronic entities (food processor 10.1 in the example described above) with the secondary management server 14;
- processing the user request received from the application on the terminal 16;
- extracting information from the user request;
- generating a request for the main management server 13;
- verifying that at least a first electronic entity associated with the user identified in a user request is registered on the secondary management server before generating the request for the main management server 13;
- processing the event data received from the main management server 13;
- generating the newsfeed of a user based on event data from electronic entities of a first type.

The secondary management server 14 also comprises a database 305 for storing data to be saved before, during, or after application of the method. The database 305 may store the first types specific to the secondary management server 14 (only one first type in the above example: "kitchen"), a lookup table matching user identifiers with identifiers of first electronic entities of the first type that are registered with the secondary management server 14.

The secondary management server 14 further comprises an input interface 301, or reception unit, for receiving event data from the main management server 13, event data from the first electronic entities registered with the secondary management server (the food processor 10.1), and user requests (as well as any request for exchanges between the application installed on the terminal 16 and the secondary management server).

The secondary management server 14 further comprises an output interface 306, or transmission unit, adapted to transmit the request to the main management server 13 and to transmit the newsfeed for display on the user terminal 16.

The secondary management server 14 may further comprise a digital signal processor (DSP) 302.

Figure 4:
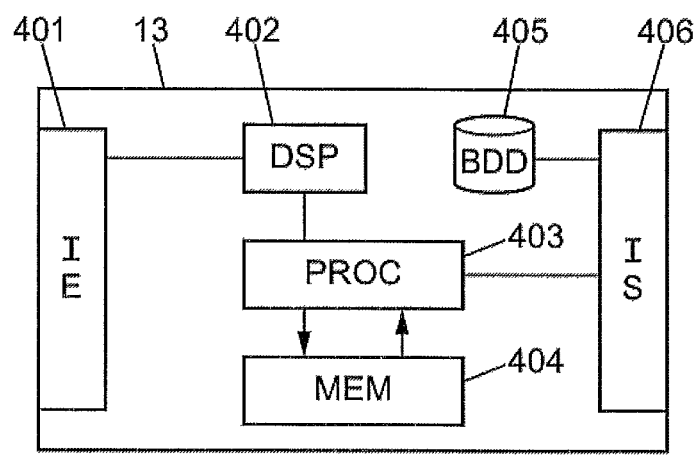
FIG. 4 illustrates a main management server according to one embodiment of the invention.

FIG. 4 represents a main management server 13 according to one embodiment of the invention.

The main management server 13 comprises random access memory 404 and a processor 403 for storing instructions to implement the steps of the method described above which are specific to the main management server 13. In particular, the processor 403 is configured for:
- managing the registration of electronic entities (the thermometer 10.3, the refrigerator 10.2, and possibly the food processor 10.1, in the example described above);
- managing the event data received from the registered electronic entities and generating a global newsfeed from the event data;
- processing the request received from the secondary management server 14;
- extracting information from the request, and in particular determining the first type from which the first set is to be selected;
- selecting the entities of the first set of electronic entities among the registered electronic entities, from the first type identified in the request;
- grouping the event data from the electronic entities of the first set.

The main management server 13 also comprises a database 405 for storing data to be saved before, during, or after application of the method. The database 405 may store the associations between user identifiers, identifiers of registered electronic entities, and types of electronic entities. The database 405 may also store the identifiers of registered electronic entities in association with event data received by them (possibly accompanied by a time stamp).

The main management server 13 may further comprise an input interface 401, or reception unit, for receiving event data from registered electronic entities and the requests from the secondary management server 14, as well as any request for exchanges between a dedicated application of the terminal 16 and the main management server 13 (for example a request to display the global newsfeed of a particular user).

The main management server 13 may further comprise an output interface 406, or transmission unit, adapted to transmit the event data of the electronic entities of the first set to the secondary management server 14.

The main management server 13 may further comprise a digital signal processor (DSP) 302.

The present invention is not limited to the embodiments described above as examples; it extends to other variants.

In addition, the provided examples involve three connected entities and a single access point. Such an architecture is given for illustrative purposes only and does not restrict the invention to these examples.

The invention claimed is:

1. A method of managing a plurality of electronic entities in conjunction with a main management server and a secondary management server, wherein each electronic entity that is registered with the main management server is associated with a given type of a plurality of types and with a user identifier in the main management server, and is configured to transmit event data to the main management server, the main management server configured to display a global newsfeed that groups data from the plurality of electronic entities, the secondary management server being dedicated to one or more entities of the plurality of electronic entities, the one or more entities being of a first type of electronic entity, the method comprising:
- registering a first electronic entity with the secondary management server, the first electronic entity being associated with the first type and with a first user identifier, the first electronic entity configured to transmit event data to the secondary management server;
- verifying, by the secondary management server, whether the first user identifier is associated with the first electronic entity registered with the second management server;
- if the first electronic entity has been registered with the secondary management server, transmitting to the main management server from the secondary management server a request indicating information relating to the first type of electronic entity comprising the first user identifier;
- determining, by the main management server, a first set of electronic entities comprising the electronic entities associated with the first type identified in the request and associated with the first user identifier;
- transmitting, by the main management server, event data from electronic entities of the first set to the secondary management server;
- publishing, by the secondary management server, event data from the electronic entities of the first set on a newsfeed of a user associated with the first user identifier,
- wherein the given type of electronic entity is at least one of: use, location, and years of service of the electronic entity.

2. The method according to claim 1, comprising installing an application on a terminal of a user associated with the first user identifier, the application enabling access to the secondary management server, the request being transmitted by the secondary management server upon receipt of a user request issued from the application installed on the user terminal.

3. The method according to claim 1, wherein the request is transmitted by the secondary management server following the step of registering the first electronic entity with the secondary management server.

4. The method according to claim 1, wherein the event data from the first electronic unit are published on the newsfeed of the user with the event data from electronic entities of the first set.

5. The method according to claim 1, further comprising:
- transmitting, by the secondary management server, event data from the first electronic entity to the main management server;
- publishing, by the main management server, the event data on the global newsfeed of the user associated with the first user identifier.

6. The method according to claim 1, wherein the transmitting of the request to the main management server is dependent upon prior registration of the first electronic entity with the secondary management server.

7. The method according to claim 1, wherein the information relating to the first type of electronic entity is an identifier of the first electronic entity, and wherein the identifier of the first electronic entity has been previously registered with the main management server in association with an identifier of the first type.

8. The method according to claim 1, wherein the information relating to the first type of electronic entity is an identifier of the first type.

9. A non-transitory computer-readable storage medium with a program stored thereon, the program comprising instructions for implementing the method according to claim 1, when these instructions are executed by a processor.

10. A secondary management server for a newsfeed of a user, wherein the secondary management server comprises:
a transmission unit configured to, if a first electronic entity of a plurality of electronic entities has been registered with the secondary management server, transmit, to a main management server, a request indicating information relating to a first type of electronic entity and comprising a first user identifier, the main management server configured to display a global newsfeed that groups data from the plurality of electronic entities, the secondary management server being dedicated to one or more entities of the plurality of electronic entities, the one or more entities being of a first type of electronic entity;
a reception unit configured to receive, from the main management server, event data originating from electronic entities of a first set, the first set comprising electronic entities associated with the first type identified in the request and associated with the first user identifier; and
a processor configured to:
register the first electronic entity with the secondary management server, the first electronic entity being associated with the first type and with the first user identifier, the first electronic entity configured to transmit event data to the secondary management server;
verify whether the first user identifier is associated with the first electronic entity registered with the second management server; and
publish the event data originating from the electronic entities of the first set, on a newsfeed of a user associated with the first user identifier,
wherein the first type of electronic entity is at least one of: use, location, and years of service of the electronic entity.

11. A system for managing a plurality of electronic entities, the system comprising:
a main management server comprising:
a memory storing each electronic entity in association with a given type of a plurality of types and a user identifier;
a reception unit configured to:
receive event data from the electronic entities;
receive, from a secondary management server, a request indicating information relating to a first type of electronic entity and comprising a first user identifier;
a processor configured to determine a first set of electronic entities comprising the electronic entities which are associated with the first type identified in the request and which are associated with the first user identifier; and
a transmission unit configured to transmit event data originating from the electronic entities of the first set, to the secondary management server,
wherein the given type of electronic entity is at least one of: use, location, and years of service of the electronic entity; and
the secondary management server of claim 10.

* * * * *